United States Patent [19]

Dennis et al.

[11] 4,224,217
[45] Sep. 23, 1980

[54] COMBUSTION RESISTANT AROMATIC POLYMERS CONTAINING CHAR-FORMING BENZYL AND/OR ALLYL MOIETIES

[75] Inventors: Kent S. Dennis, Midland, Mich.; Joseph W. Raksis, Columbia, Md.

[73] Assignee: The Dow Chemical Company, Midland, Mich.

[21] Appl. No.: 866,971

[22] Filed: Jan. 5, 1978

[51] Int. Cl.$^3$ .................. C08L 69/00; C08L 55/02; C08L 25/08

[52] U.S. Cl. .................. 260/45.7 R; 260/45.75 W; 260/45.75 V; 260/45.75 P; 260/45.75 M; 260/45.75 N; 260/45.75 C; 260/45.75 D; 260/45.75 R; 260/45.75 G; 525/76; 525/129; 525/146; 525/209; 526/293; 526/294; 525/213

[58] Field of Search .................. 260/47 XA, 873, 874, 260/45.75 R, 45.75 C, 45.75 M, 45.75 N, 45.75 G, 45.75 P, 45.7 R; 526/293, 294, 292

[56] References Cited

U.S. PATENT DOCUMENTS

| | | | |
|---|---|---|---|
| 3,058,953 | 10/1962 | McMaster | 526/292 |
| 3,072,588 | 1/1963 | Vitkuske et al. | 526/293 |
| 3,124,554 | 3/1964 | Schnell et al. | 260/47 X A |
| 3,284,544 | 11/1966 | Eichhorn | 260/893 |
| 3,615,972 | 10/1971 | Morehouse et al. | 156/79 |
| 3,671,469 | 6/1972 | Doorenbos | 526/293 |
| 3,766,136 | 10/1973 | Howell et al. | 260/45.7 R |
| 3,822,234 | 7/1974 | McRowe | 260/45.75 R |
| 3,835,093 | 9/1974 | Anderson | 260/45.9 R |
| 3,872,067 | 3/1975 | Harris | 526/293 |
| 3,900,536 | 8/1975 | D'Alelio | 260/45.7 R |
| 3,956,399 | 5/1976 | Paritee et al. | 260/45.85 R |
| 4,049,618 | 9/1977 | Kracklauer | 521/903 |
| 4,101,510 | 7/1978 | Spanswick | 260/881 |

FOREIGN PATENT DOCUMENTS 7343382 12/1973 Japan.

Primary Examiner—Wilbert J. Briggs, Sr.

[57] ABSTRACT

The char-forming characteristics of aromatic polymers containing one or more combustion resistant components are improved by incorporating therein a polybenzyl, a polyallyl, or an allyl/benzyl moiety. As an example, a styrene polymer comprising a halogenated comonomer such as bromostyrene is rendered char-forming by the presence of copolymerized vinylbenzyl chloride in the styrene polymer. Such polymeric compositions are useful in the manufacture of shaped articles such as housings for electrical appliances.

21 Claims, No Drawings

COMBUSTION RESISTANT AROMATIC POLYMERS CONTAINING CHAR-FORMING BENZYL AND/OR ALLYL MOIETIES

BACKGROUND OF THE INVENTION

This invention relates to char-forming aromatic polymers having reduced flame propagation characteristics.

By reason of their desirable physical properties and reasonable cost, aromatic polymers such as polystyrene and bisphenol-A polycarbonate have been used in diverse applications, e.g., as solid molding materials and as foamed compositions. Unfortunately, such polymers burn readily and continuously upon exposure to flame.

It has been a wide-spread practice to reduce the propensity of such polymers to ignite by incorporating into them various phosphorous, nitrogen and halogen-containing additives. Such additives, however, often deleteriously affect the physical properties of the aromatic polymers. In addition, these aromatic polymers, even though modified to be combustion resistant, melt or drip upon exposure to flame. As a result, a puddle of burning polymer is often formed that evolves substantial quantities of noxious fumes and smoke.

In view of the aforementioned deficiencies of conventional aromatic polymers, it would be highly desirable to provide aromatic polymer compositions which are combustion resistant and char-forming with minimum sacrifice of physical properties.

SUMMARY OF THE INVENTION

The present invention is a char-forming aromatic polymer composition comprising a normally solid aromatic polymer, a char-forming amount of a plurality of active benzyl and/or active allyl moities. Preferably the char-forming composition also contains an amount of a combustion retarding component that is effective to reduce the propensity of the aromatic polymer composition to propagate burning or combustion after removal of a small scale ignition source. Hereinafter this property of reduced propensity to propagate combustion shall be called "combustion resistance." For the purposes of this invention a small scale ignition source is one which is comparable to a Bunsen burner in total heat output.

Due to the presence of a combustion resistant component, it might be expected that the preferred aromatic compositions of the present invention would exhibit some combustion resistance. However, it is indeed surprising that the presence of the plurality of benzyl and/or allyl moieties (hereinafter collectively called active carbon component) imparts char-forming character to the composition even in the absence of combustion reducing agent. It is also surprising that the active carbon component reduces the amount of combustion resistant agent normally employed to provide a given level of combustion resistance. Thus, the preferred aromatic polymer compositions of this invention employ less total halogen to provide a given reduction in combustion propensity. In addition, lower quantities of noxious fumes are generated upon combustion of such compositions.

The aromatic polymer compositions of this invention are generally useful in any application which conventional aromatic compositions are employed. However, because of their char-forming character these compositions are particularly useful in manufacture of housings for electrical appliances, furniture and wall paneling.

DETAILED DESCRIPTION OF ILLUSTRATIVE EMBODIMENTS

In the present invention, the aromatic polymer is a normally solid polymer having an aromatic moiety with at least one aromatic ring position available for alkylation. Typically such polymers are those suitably employed in the manufacture of molding articles, fibers, films, and/or foams. Although such polymers are preferably thermoplastic, the thermosetting aromatic polymers are useful as well.

Exemplary aromatic polymers include monovinylidene aromatic polymers such as polystyrene, poly(t-butylstyrene), rubber-modified polystyrene (often called high impact polystyrene), styrene/acrylonitrile copolymers, styrene/maleic anhydride copolymers including their rubber-modified derivatives, acrylonitrile/butadiene/styrene terpolymers including the so-called ABS resins, styrene/acrylic acid copolymers, styrene/acrylamide copolymers, styrene/alkyl acrylate copolymers such as styrene/methyl methacrylate, styrene/ethyl acrylate and styrene/butyl acrylate copolymers, cross-linked styrene polymer compositions wherein the cross-linking agent is a polyethylenically unsaturated compound such as divinyl benzene or unsaturated polyesters, e.g., unsaturated condensation reaction products of polycarboxylic acids with polyhydric alcohols such as dipropylene glycol maleate. Also suitable are aromatic polycarbonates including polycarbonates of dihydric phenols such as the bis(hydroxyphenyl)alkylidenes (e.g., 2,2-bis(4-hydroxyphenyl)propane [bisphenol-A], and other bisphenol-A type diols as described in U.S. Pat. No. 3,028,365 as well as the corresponding aromatically substituted or aliphatically substituted dihydric phenols wherein the substituents are halo, nitro, oxo, alkyl, acyl, carboxylate ester, sulfonate ester and the like,) and phenolphthalein and aromatically substituted derivatives thereof as described in U.S. Pat. No. 3,036,036. Other useful aromatic polymers include aromatic polyesters such as polyethylene terephthylate and polybutylene terephthylate and polyurethanes, particularly those derived from aromatic diisocyanates such as toluene diisocyanate and/or dihydric phenols particularly bisphenol-A; epoxide polymers, e.g., those derived from glycidyl ether of bisphenol-A; polyphenylene oxides and polyphenylene sulfides.

Of particular interest for the purposes of this invention are the monovinylidene aromatic polymers, especially polystyrene and copolymers of predominantly styrene and other copolymerizable monomers such as acrylonitrile, butadiene, ar-bromostyrene, methyl methacrylate, and maleic anhydride. For the purposes of this invention, "monovinylidene aromatic" shall mean a polymerizable monomer represented by the formula:

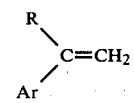

wherein R is hydrogen or lower alkyl such as methyl or ethyl and Ar is aryl such as phenyl or substituted aryl such as chlorophenyl.

The active carbon component comprises at least two active benzyl, at least two active allyl moieties or at least one of each, i.e., the component comprises a plurality of benzyl and/or allyl moieties. For the purposes of this invention, an active benzyl or allyl moiety is a benzyl or allyl carbon bonded to a group which exhibits a pKa less than about 20, preferably from about 0 to about 18, most preferably from about 4 to about 16. Advantageously, the benzyl and allyl moieties can be represented generically by the formula:

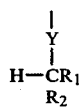

$$\begin{array}{c} | \\ Y \\ | \\ H\text{---}CR_1 \\ R_2 \end{array}$$

wherein Y is arylene, inertly substituted arylene, ethenylene or inertly substituted ethenylene; $R_1$ is independently hydrogen, hydrocarbyl such as alkyl or aryl or other suitably inert monovalent radical; and each $R_2$ is independently halogen, alkoxy, aryloxy, alkylcarbonyloxy such as acetoxy, arylcarbonyloxy such as benzoyloxy, or hydroxy. "Inertly substituted" or "suitably inert" means that the substituent radical does not impede the reaction of the active carbon component with the aromatic polymer to form the desired char. Typically any substituents that do not impede the alkylation of aromatic compounds are suitably inert.

The active carbon component is suitably a compound containing a plurality of benzyl and/or alkyl moieties which may be physically incorporated into the aromatic polymer. Alternatively, the active carbon component may be made in situ in the aromatic polymer by copolymerizing a benzylic and/or an allylic comonomer with the monomeric components of the aromatic polymer. Such copolymerization may be addition or condensation copolymerization. Examples of preferred benzylic comonomers for addition copolymerization include ethylenically unsaturated benzyl halides such as vinylbenzyl chloride and vinylbenzyl bromide, ethylenically unsaturated benzyl ethers such as monochlorophenyl vinylbenzyl ether, pentachlorophenyl vinylbenzyl ether, trichlorophenyl vinylbenzyl ether, tribromophenyl vinylbenzyl ether, pentabromophenyl vinylbenzyl ether and vinylbenzyl methyl ether; ethylenically unsaturated benzyl esters of carboxylic acids such as vinylbenzyl acetate, vinylbenzyl formate and vinylbenzyl propionate; vinylbenzyl alcohol; vinylbenzyl ethers such as phenyl vinylbenzyl ether and the like. Such benzylic addition comonomers are particularly useful when copolymerized with monovinylidene aromatics, particularly styrene, ar-bromostyrene, ar-(t-butyl)styrene, and vinyl toluene. Examples of allylic comonomers useful in addition copolymerization include 2-(pentachlorophenoxymethyl)butadiene, 2-(methoxymethyl)butadiene, 2-(acetoxymethyl)butadiene, and 2-(hydroxymethyl)butadiene. Like the foregoing benzylic addition comonomers, the allylic addition comonomers are suitably copolymerized with the monovinylidene aromatics. Of the benzylic and allylic comonomers, the benzylic ones are preferred.

Although less preferred than the addition comonomers, examples of suitable benzylic condensation comonomers include benzylic diols and the ar-halomethyl, ar-alkoxymethyl and ar-aryloxymethyl derivatives of aromatic diols, aromatic diacids and aromatic diisocyanates such as p-bis(hydroxymethyl)benzene, ar-(hydroxymethyl)phthalic acid, and α-acetoxytoluene diisocyanate. Suitable allylic condensation comonomers include (1-methoxy-3-propenyl)succinic anhydride.

While it is often desirable to incorporate the active carbon moiety, benzyl and/or allyl, into the aromatic polymer via copolymerization of a comonomer with the other monomers of the polymer, it is also suitable to incorporate the active carbon moiety into the aromatic polymer by blending a polymer or other compound containing a plurality of benzylic and/or allylic moieties with the aromatic polymer. Such additive compounds including the polymers should exhibit boiling points greater than 200° C., preferably greater than 250° C., and should not decompose under conditions used to incorporate the active carbon additive into the aromatic polymer and to form the aromatic polymer containing the additive into a desired shape. Exemplary polymers having a plurality of suitably active benzyl moieties include polyvinylbenzyl chloride, poly(vinylbenzyl methyl ether), poly(vinylbenzylpentachlorophenyl ether), poly(vinylbenzyl tribromophenyl ether), poly(vinylbenzyl alcohol), poly(vinylbenzyl acetate) as well as copolymers including one or more of the monomeric components of such polymers. Other exemplary compounds having a plurality of benzylic moieties include bis[4-(chloromethyl)phenyl]oxide, bis(acetoxymethyl)benzene, and 4,4'-bis(methoxymethyl)biphenyl. Exemplary polymers containing a plurality of allylic moieties include homopolymers and copolymers of 2-(pentachlorophenoxymethyl)butadiene and 2-(tribromophenoxymethyl)pentadiene. Of the foregoing active carbon additives, the polymers of a poly(halophenyl vinylbenzyl) ether such as pentachlorophenyl and tribromophenyl vinylbenzyl ethers are preferred, with pentachlorophenyl vinylbenzyl ether being especially preferred. These preferred ethers are readily prepared by reacting vinylbenzyl chloride with an alkali metal salt of the appropriate phenol.

The foregoing active carbon components are employed in concentration sufficient to provide a desirable amount of char usually at least about 5, preferably from about 10 to about 50, weight percent based on the weight of the aromatic polymer. Generally such concentrations of the active carbon component are within the range from about 0.1 to about 1.5 milliequivalents of active carbon moiety per gram of aromatic polymer composition including the active carbon component, preferably from about 0.2 to about 0.8 milliequivalent per gram.

In addition to the active carbon component, it is generally preferred to incorporate into the aromatic polymer an amount of a conventional combustion retarding component that is effective to reduce the flame propagation characteristics of the aromatic polymer. Most often the conventional combustion retarding component is a halogenated organic moiety wherein (1) halogenated organic groups are an integral part of the aromatic polymer via copolymerization therewith or (2) a separate additive mixed therewith. Advantageously, the halogenated organic moiety contains a plurality of bromine and/or chlorine atoms with a combined concentration thereof being in the range of about 25 to about 90 weight percent based on the halogenated organic moiety, more advantageously from about 40 to about 88 weight percent, particularly when the halogen is primarily bromine.

Examples of the halogenated organic moiety as an integral part of the aromatic polymer macromolecule includes copolymerized comonomers such as bromostyrene, chlorostyrene, dibromostyrene, tribromoneopentyl methacrylate, pentachlorophenyl vinylbenzyl ether and tribromophenyl vinylbenzyl ether and the like. Exemplary halogenated organic moieties in the form of compounds which may be incorporated into the aromatic polymer include active chlorinated compounds such as chlorinated paraffin, chlorinated cyclic hydrocarbons such as hexachlorocyclohexane and hexachlorocylododecane, chlorinated acyclic hydrocarbons such as hexachloroethane and pentachloroethane; active brominated compounds which have either α-hydrogen or α-halogen available for dehydrobromination or dehalogenation such as hexabromocyclohexane, octabromododecane, hexabromoethane and the like; passive brominated compounds which do not dehydrohalogenate or dehalogenate at temperatures below 150° C. such as hexabromobenzene, decabromodiphenyl oxide, polybromoallyl and polybromoneopentyl alcohols as well as polybromoallyl and polybromoneopentyl alcohol esters of carboxylic acids; polybromophenoxy ethanes, polybromophenoxy triazines and the like. Additional examples of suitable halogenated organic compounds appear in U.S. Pat. No. 4,012,343. Alternative to, or in combination with, the aforementioned halogenated organic moieties, other conventional combustion retarding agents such as halogenated phosphate esters and ammonium compounds such as ammonium bromide, may be employed.

The amount of the combustion reducing component employed in the preferred compositions is not particularly critical. Advantageously, however, the amount of the combustion reducing component is sufficient to enable the preferred composition to have a classification of V-I, most advantageously a classification of V-O, under Standard Test UL-94 of Underwriters' Laboratory. When the combustion retarding agent is a halogenated moiety as is preferred, the amount of halogenated moiety employed is advantageously sufficient to provide from about 2 to about 60 weight percent of halogen based on the total weight of total aromatic polymer composition, including active carbon moieties and combustion retarding agent, preferably from about 4 to about 20 weight percent of halogen which is preferably bromine. It should be understood, however, that the polybenzyl or polyallyl component may be the sole source of halogen providing combustion retardance. An illustrative example of such polybenzyl component is a polymer of tribromophenyl vinylbenzyl ether.

In addition to the aforementioned combustion retarding component, it is often desirable to employ a conventional synergist such as antimony oxide, phosphorous, molybdenum trioxide and aluminum trihydrate. When such a synergist is used it is commonly employed in an amount from about 0.1 to about 10, preferably from about 0.5 to about 5 weight percent of synergist based on weight of total aromatic polymer composition. Of the synergists, antimony oxide is preferred.

In addition to the aforementioned components which may be incorporated into the aromatic polymer composition other additives such as UV stabilizers, smoke reducing agents, antioxidants, pigments, fillers and other additives having any of a variety of functions may be incorporated into the polymer composition. Such other additives of particular interest are those inorganic compounds which effectively reduce the amount of smoke produced upon combustion of the aromatic polymer and which in some instances contribute to the char-forming capability of the polybenzyl moiety. Exemplary inorganic compounds (also called smoke reducing agents) include the alkali metal zinc ferrous cyanides as described in U.S. Pat. No. 3,822,234 as well as the ferro and ferri cyanide salts of metals such as nickel, calcium, barium, copper, chromium, cobalt, zinc, magnanese, magnesium and alkali metals such as sodium and potassium and including mixtures thereof. Also useful are ferrocenes, sulfates of iron; acetyl acetonates of copper, cobalt, manganese, vanadium, nickel, chromium and iron and the oxides of iron, nickel, copper, chromium, cobalt, zirconium, molybdenum and manganese.

Of the foregoing smoke reducing agents, the metal ferri and ferro cyanide salts such as $Ni_3[Fe(CN)_6]_2$, $K_4Fe(CN)_6$, $K_2Ni_3[Fe(CN)_6]_2$, $K_2Zn_3[Fe(CN)_6]_2$ and $K_2CaFe(CN)_6$ are preferred. While it is often not necessary to use such smoke reducing agents in the practice of the present invention, it is generally desirable to employ them in amounts effective to reduce the amount of smoke produced by the combustion of the aromatic polymer composition, preferably in amounts from about 1 to about 20 weight percent of the smoke reducing agent based on the weight of total aromatic polymer composition. In addition, it is found that the use of the oxides of calcium, strontium, magnesium and barium in combination with the aforementioned cyanide salts further enhance char formation and smoke reduction.

In making the char-forming aromatic composition in accordance with this invention, the active carbon component and, when desired, the optional combustion retarding component are either copolymerized into the aromatic polymer or blended with the aromatic polymer as a separate component or components as the case may be. When the copolymerization route for incorporating the critical active carbon component and the optional combustion retarding component is employed, the resulting aromatic polymer is the aromatic polymer composition which is suitable for molding into the desired parts directly or optionally blended with various additive ingredients as mentioned hereinbefore and then molded. When the active carbon component and/or the optional combustion retarding component are incorporated into the aromatic polymer via the additive route, the active carbon component and the combustion retarding component, which may or may not be the same compound, are incorporated into the aromatic polymer by conventional mixing techniques. For example, the components may be dry blended in granular or powder form and then fed through a plastic extruder or similar mixing device such as a hot roll mill or a Banbury mixer. In a similar manner, optional agents such as fillers, synergists, dyes, stabilizers and smoke reducing agents are incorporated into the aromatic polymer to form the desired aromatic polymer composition. In instances wherein foamed aromatic polymer compositions are desired, the aforementioned composition having incorporated therein a conventional foaming agent such as volatile halogenated hydrocarbon, volatile hydrocarbon, or solid chemical blowing agents is converted to heat-plastified form and extruded to a zone of lower pressure sufficient to cause expansion of the extruded material with the resultant formation of the desired foamed aromatic polymer composition. Such blending and foaming procedures are conventional and need not be further discussed here.

The following examples illustrate the modes in which the principle of the invention has been applied but should not be construed as limiting its scope. All parts and percentages are by weight unless otherwise indicated.

EXAMPLE 1

A monomer mixture is prepared by mixing 10 parts of vinylbenzyl chloride, 25 parts of bromostyrene and 65 parts of styrene in an 8-ounce bottle. Thereafter sufficient azobis(isobutyronitrile) initiator is added to the monomer mixture to provide an initiator concentration of 0.15 percent based on total monomer weight. The bottle is placed in a heat-transfer bath and maintained at a temperature of 70° C. for about 5 days. The resulting polymer is devolatilized at 70° C. under <5 mm Hg vacuum for about 15 hours. The resulting resin sample is mixed with antimony oxide on a Brabender type of mixer at 160° C. In a similar manner, other resin samples are prepared using different proportions of the monomers as specified in Table I. The resulting samples are molded into test bars ($\frac{1}{2}"\times 1/16"\times 5"$) and tested for reduced flame propagation character according to Underwriters' Lab Test UL-94. The results of these tests are recorded in Table I.

For the purposes of comparison, a polymer composition containing no vinylbenzyl chloride is prepared and blended with different additives and tested for reduced flame extinguishment characteristics. These results are also recorded in Table I.

TABLE I

| Sample No. | Polymer(1) | Minimum Amount of Sb$_2$O$_3$(2), pph | Flame Extinguishment Rating(3) |
| --- | --- | --- | --- |
| 1 | 10 VBC/25 BrS/65 S | 1.0 | V-0, non-dripping |
| 2 | 10 VBC/20 BrS/70 S | 2.0 | " |
| 3 | 5 VBC/20 BrS/75 S | 3.0 | " |
| 4 | 5 VBC/20 BrS/75 S | 2.0 | " |
| C* | 30 BrS/70 S | 3.0 | V-2 flaming drips |

*Not an example of the invention.
(1)Polymer in weight parts of monomeric component wherein VBC is vinylbenzyl chloride, BrS is bromostyrene, and S is styrene.
(2)Minimum amount of Sb$_2$O$_3$ (synergist) in parts per hundred parts of the polymer that will yield at least a V-1 flame propagating rating.
(3)Underwriters' Laboratory Test UL-94 wherein V-0 indicates that the sample does not have a flaming drip and self-extinguishes within 10 seconds after removal of the flame. V-1 indicates that the sample does not have flaming drips and self-extinguishes within 30 seconds after removal of the flame. V-2 indicates that the sample has flaming drips and self-extinguishes within 30 seconds after removal of the flame.

As evidenced by the foregoing data of Table I, particularly Sample No. C and Sample No. 3, a substantially greater amount of antimony oxide is required to provide the desired flame extinguishment rating in the absence of VBC than when VBC is employed. Moreover, the VBC clearly imparts desired char-forming (non-dripping) character even when used at the 5 parts per hundred level.

EXAMPLE 2

Following generally the procedure of Example 1, two copolymers of vinylbenzyl chloride and styrene are prepared and then blended with varying amounts of decabromodiphenyl oxide and antimony oxide. The resulting compositions are molded into test bars and tested for reduced flame extinguishment according to Underwriters' Lab Test UL-94. The results of these tests are recorded in Table II.

For purposes of comparison, a sample is prepared according to the foregoing procedure using polystyrene instead of vinylbenzyl chloride/styrene copolymer. The sample is tested by UL-94 and the result is recorded in Table II.

TABLE II

| Sample No. | Polymer(1), wt parts monomer | Combustion Retarding Component(4), wt ratio | Synergist(2), pph | Flame Extinguishment Rating(3) |
| --- | --- | --- | --- | --- |
| 1 | 10 VBC/90 S | 89:11 | 1.5 Sb$_2$O$_3$ | V-0 non-dripping |
| 2 | " | 92:8 | 2.0 Sb$_2$O$_3$ | " |
| 3 | 5 VBC/95 S | 89:11 | 2.0 Sb$_2$O$_3$ | " |
| 4 | " | 92:8 | 3.0 Sb$_2$O$_3$ | V-1 non-dripping |
| 5 | " | 92:8 | 4.0 Sb$_2$O$_3$ | V-0 non-dripping |
| 6 | " | 92:8 | 2.0 Sb$_2$O$_3$ 2.0 ZnO | " |
| 7 | " | 93:7 | 4.5 Sb$_2$O$_3$ | " |
| 8 | " | 93:7 | 4.0 Sb$_2$O$_3$ | V-1 non-dripping |
| 9 | " | 93:7 | 2.0 Sb$_2$O$_3$ 2.0 ZnO | V-0 non-dripping |
| C* | 100 S | 88.5:11.5 | 3.5 Sb$_2$O$_3$ | V-2 flaming drips |

*Not an example of invention
(1)-(3)Same as in Table I
(4)Weight ratio of polymer to combustion retarding component (decabromodiphenyl oxide)

As evidenced by the results of Table II, in the vinylbenzyl chloride polymers lower quantities of combustion retarding agent and synergist are required to obtain better combustion resistance and char formation than are obtainable in the polystyrene sample.

EXAMPLE 3

Following generally the polymerization procedure of Example 1 several different copolymers are prepared employing different monomer recipes as well as different smoke reducing agents as described in Table III. The metal salts are blended with solutions of the polymers in tetrahydrofuran. The resulting compositions are devolatilized and molded into test discs and tested for smoke reduction and char formation using the Arapahoe Smoke Chamber. The results of these tests are recorded in Table III.

TABLE III

| Sample No. | Polymer(1), wt pts monomer | Smoke Reducing Agent(5) Type | Amount, pph | % Smoke(6) | % Char(6) |
| --- | --- | --- | --- | --- | --- |
| 1 | 80 BrS/20 VBC | None | | 22 | 10 |
| 2 | 80 BrS/20 VBC | Ni$_3$[Fe(CN)$_6$]$_2$ | 5 | 12.3 | 40 |
| 3 | 80 BrS/20 VBC | K$_2$CaFe(CN)$_6$ | 5 | 12.8 | 43 |

TABLE III-continued

| Sample No. | Polymer[1], wt pts monomer | Smoke Reducing Agent[5] Type | Amount, pph | % Smoke[6] | % Char[6] |
|---|---|---|---|---|---|
| 4 | 80 BrS/20 VBC | $K_2Zn_3[Fe(CN)_6]_2$ | 5 | 17.5 | 32 |
| 5 | 80 BrS/20 VBC | $K_3Fe(CN)_6$ | 5 | 12.6 | 45 |
| 6 | 80 BrS/20 VBC | $K_4Fe(CN)_6$ | 5 | 12.9 | 42 |
| 7 | 80 BrS/20 VBC | $K_2BaFe(CN)_6$ | 5 | 15.9 | 36 |
| 8 | 80 BrS/20 VBC | $Cu_3[Fe(CN)_6]_2$ | 5 | 14.5 | 32 |
| 9 | 80 BrS/20 VBC | $K_2Ni_3[Fe(CN)_6]_2$ | 5 | 13.0 | 36 |
| 10 | 80 BrS/20 PCPVBE | None | | 25.8 | 9 |
| 11 | 80 BrS/20 PCPVBE | $K_2Zn_3[Fe(CN)_6]_2$ | 5 | 12.9 | 47 |
| 12 | 40 S/40 BrS/20 VBC | None | | 23.5 | 18 |
| 13 | 40 S/40 BrS/20 VBC | $K_4Fe(CN)_6$ | 5 | 16.1 | 35 |
| 14 | 40 S/40 BrS/20 VBC | $K_2MgFe(CN)_6$ | 5 | 17.2 | 32 |
| 15 | 80 BrS/20 VBC | $K_2CaFe(CN)_6$ | 1 | 17.0 | 28 |
| 16 | 80 BrS/20 VBC | $K_2CaFe(CN)_6$ | 2.5 | 14.8 | 36 |
| 17 | 80 BrS/20 VBC | $K_2CaFe(CN)_6$ | 7.5 | 14.6 | 37 |
| 18 | 80 BrS/20 VBC | $K_2CaFe(CN)_6$ | 10 | 10.3 | 50 |
| 19 | 80 ClS/20 VBC | None | | 21.6 | 10 |
| 20 | 80 ClS/20 VBC | $K_2CuFe(CN)_6$ | 5 | 16.7 | 31 |
| 21 | 80 BNPMA/20 VBC | None | | 10.7 | 9 |
| 22 | 80 BNPMA/20 VBC | $K_2Ni[Fe(CN)_6]_2$ | 5 | 7.6 | 18 |
| 23 | 90 BrS/10 VBC | None | | 21.0 | 26 |
| 24 | 90 BrS/10 VBC | $K_2CaFe(CN)_6$ | 5 | 12.5 | 45 |
| 25 | 85 BrS/15 VBC | None | | 19.8 | 21 |
| 26 | 85 BrS/15 VBC | $K_2CaFe(CN)_6$ | 5 | 13.4 | 44 |
| 27 | 95 BrS/5 VBC | $K_2CaFe(CN)_6$ | 5 | 16.9 | 30 |
| 28 | 80 BrS/20 VBC | None | | 23.0 | 9 |
| 29 | 80 BrS/20 VBC | $K_2Ni(CN)_4$ | 5 | 19.4 | 20 |
| 30 | 80 BrS/20 VBC | $K_3CO(CN)_6$ | 5 | 18.8 | 18 |
| 31 | 80 S/20 VBC | $Ni_3[Fe(CN)_6]_2$ | 5 | 19.3 | 10.9 |
| 32 | 80 S/20 VBC | $K_2Ni_3[Fe(CN)_6]_2$ | 5 | 19.0 | 11.7 |
| 33 | 80 S/20 VBC | $K_2CaFe(CN)_6$ | 5 | 20.1 | 16.8 |
| 34 | 80 S/20 VBC | $K_2Zn_3[Fe(CN)_6]_2$ | 5 | 18.6 | 20.7 |

[1] Same as (1) in Table I plus ClS is ar-chlorostyrene, PCPVBE is pentachlorophenyl vinylbenzyl ether and BNPMA is bromoneopentyl methacrylate.
[5] Amount of smoke reducing agent in parts per hundred parts of polymer.
[6] Percent smoke and percent char are measured using the Arapahoe Smoke Chamber, described in Plastics Technology, p. 46 (March, 1976). A disc (1/8" thickness by 1" diameter) of the polymer composition weighing ~0.5 g is impaled on a wire and burned over a flame in the chamber for 60 seconds. The smoke is collected on a filter paper in the chamber and is weighed to determine smoke mass. The remaining char is also weighed.

$$\% \text{ char} = \frac{\text{wt of sample after burning}}{\text{initial wt of sample}}$$

$$\% \text{ smoke} = \frac{(\text{wt of smoke} + \text{wt of filter paper}) - \text{wt of filter paper}}{\text{initial wt of sample}}$$

As evidenced by the foregoing data, the presence of the smoke reducing agent not only increases the amount of char formed, but also reduces the amount of smoke generated upon combustion of the polymer composition.

EXAMPLE 4

An aromatic polymer composition is prepared by blending 20 parts of a pentachlorophenyl vinylbenzyl ether (PCPVBE)/styrene (50/50) copolymer with 69.5 parts of a rubber modified polystyrene containing about 6 percent of butadiene rubber, 3.5 parts of antimony oxide and 7 parts of decabromodiphenyl oxide (DBDPO). The composition is molded into a test bar (1/16"×1/2"×5") and tested for combustion retardance by UL-94. The composition achieves a rating of V-O and does not drip.

When a similar comparative sample is prepared except that polystyrene is substituted for the PCPVBE copolymer, more than 12 parts of DBDPO is required to achieve a rating of V-O. At such level of DBDPO, the burning sample produces no char.

Results similar to those reported for the preceding samples are achieved with 5 parts of 1,2-bis(2,4,6-tribromophenoxy)ethane and 5 parts of tris(2,4,6-tribromophenoxy)triazine are substituted for 7 parts of DBDPO in the preceding samples.

EXAMPLE 5

Following the procedure of Example 3, several samples are prepared by blending pentachlorophenyl vinylbenzyl ether (PCPVBE)/styrene (30/70) copolymer with different smoke reducing agents and calcium oxide amounts as indicated in Table IV. the samples are tested for percent smoke and percent char and the results are reported in Table IV.

Following the same procedure, several samples are prepared by blending tribromophenyl vinylbenzyl ether (TBPVBE)/styrene (35/65) copolymer with different smoke reducing agents and calcium oxide in amounts as indicated in Table IV. The samples are similarly tested, and the results are recorded in Table IV.

TABLE IV

| Sample No. | Smoke Reducing Agent Type | Amount, pph | Calcium Oxide, pph | % Smoke(6) | % Char(6) |
|---|---|---|---|---|---|
| PCPVBE/Styrene Copolymer | | | | | |
| 1 | $Ni_3[Fe(CN)_6]_2$ | 5 | — | 19.3 | 14.3 |

TABLE IV-continued

| Sample No. | Smoke Reducing Agent Type | Amount, pph | Calcium Oxide, pph | % Smoke(6) | % Char(6) |
|---|---|---|---|---|---|
| 2 | " | 5 | 5 | 13.7 | 22.9 |
| 3 | Fe$_2$(SO$_4$)$_3$ | 5 | — | 21.7 | 10.2 |
| 4 | " | 5 | 5 | 19.0 | 18.0 |
| 5 | K$_2$Ni$_3$[Fe(CN)$_6$]$_2$ | 5 | — | 18.2 | 15.5 |
| 6 | " | 5 | 5 | 14.8 | 25.0 |
| 7 | K$_2$CaFe(CN)$_6$ | 5 | — | 23.6 | 12.5 |
| 8 | " | 5 | 5 | 18.9 | 22.0 |
| 9 | K$_3$Fe(CN)$_6$ | 5 | — | 17.9 | 20.8 |
| 10 | K$_2$Zn$_3$[Fe(CN)$_6$]$_2$ | 5 | — | 19.7 | 14.4 |
| 11 | " | 5 | 5 | 17.1 | 20.4 |
| 12 | K$_2$BaFe(CN)$_6$ | 5 | — | 22.3 | 11.4 |
| 13 | " | 5 | 5 | 19.5 | 21.5 |
| 14 | Cu$_3$[Fe(CN)$_6$]$_2$ | 5 | — | 20.9 | 9.7 |
| 15 | " | 5 | 5 | 18.2 | 20.3 |
| 16 | Na$_4$Fe(CN)$_6$ | 5 | — | 20.4 | 12.2 |
| 17 | " | 5 | 5 | 18.0 | 21.2 |
| 18 | K$_2$MgFe(CN)$_6$ | 5 | — | 21.6 | 13.4 |
| 19 | " | 5 | 5 | 18.1 | 20.8 |
| TBPVBE/Styrene Copolymer | | | | | |
| 20 | Ni$_3$[Fe(CN)$_6$]$_2$ | 5 | — | 15.0 | 23.7 |
| 21 | " | 5 | 5 | 15.7 | 26.4 |
| 22 | K$_2$Ni$_3$[Fe(CN)$_6$]$_2$ | 5 | — | 21.2 | 13.5 |
| 23 | " | 5 | 5 | 16.4 | 26.7 |
| 24 | K$_2$CaFe(CN)$_6$ | 5 | 5 | 21.0 | 22.7 |
| 25 | K$_2$Zn$_3$[Fe(CN)$_6$]$_2$ | 5 | — | 17.9 | 24.6 |
| 26 | " | 5 | 5 | 14.2 | 30.4 |
| 27 | Cu$_3$Fe(CN)$_6$ | 5 | — | 20.6 | 19.6 |
| 28 | " | 5 | 5 | 16.2 | 21.2 |

(6) Same as in Table III.

As evidenced by data of Table IV, the presence of calcium oxide in combustion with one of the aforementioned smoke reducing agents enhances char formation and in most instances reduces smoke formation.

EXAMPLE 6

As evidence of other suitable aromatic polymers, several blend samples are prepared by mixing an aromatic polymer as indicated in Table V with a copolymer of 67 percent pentachlorophenyl vinylbenzyl ether (PCPVBE) and 33 percent styrene (Sample Nos. 1–5) or a homopolymer or tribromophenyl vinylbenzyl ether (TBPVBV) (Sample No. 6) as on a Brabender mixer at 160° C. for 10 minutes. Enough of the benzylic copolymer is added in each sample to provide 10 percent of PCPVBE or 15 percent of TBPVBE based on the total composition. During mixing of some of the samples, decabromodiphenyl oxide (DBDPO) and Sb$_2$O$_3$ are added in amounts as indicated in Table V. The samples are molded into test bars (1/16"×½"×5") and subjected to the UL-94 test. The results are recorded in Table V.

TABLE V

| Sample No. | Aromatic Polymer,(1) | % DBDPO | % Sb$_2$O$_3$ | Flame Propagation Rating, (3) |
|---|---|---|---|---|
| 1 | ABS | 7 | 4 | V-0 (non-dripping) |
| 2 | SAN | 7 | 4 | V-2 (some char formed) with flaming drips |
| 3 | S/MMA | 7 | 4 | V-2 (some char formed) with flaming drips |
| 4 | HIPS | 5 | 3.5 | V-0 (non-dripping) |
| 5 | PCO | 0 | 0 | V-0 (non-dripping) |
| 6 | HIPS | 0 | 3.5 | V-0 (non-dripping) |

(1) ABS - Acrylonitrile/butadiene/styrene resin sold by The Dow Chemical Company under the code name ABS-500. SAN - Styrene/acrylonitrile (75/25) copolymer. S/MMA - Styrene/methyl methacrylate (60/40) copolymer. HIPS - Butadiene rubber modified polystyrene sold by The Dow Chemical Company under the name U492. PCO - Bisphenol-A polycarbonate.
(3) Same as (3) in Table I.

Acceptable char formation is also obtained when polymers of benzylic monomers such as vinylbenzyl alcohol, phenyl vinylbenzyl ether, methyl vinylbenzyl ether, and ethyl vinylbenzyl ether are employed in aromatic polymers. Other aromatic polymers suitably treated include polyurethanes of fairly high aromatic content (>50 mole percent).

EXAMPLE 7

Also, char formation is observed when 2-(pentachlorophenoxymethyl)butadiene polymers are employed as active carbon char-forming components. For example, when 2-(pentachlorophenoxymethyl)butadiene/styrene (90/10) copolymers are tested for char formation by burning the sample (~0.5 g) in a crucible at 800° C. for 2 minutes, a percent char of 10.5 is observed.

EXAMPLE 8

Several blends having components as specified in Table VI are prepared in the form of molded pellets (0.5"×0.125") weighing ~0.5 g. These pellets are tested for char-forming character by burning them in a crucible for 2 minutes at 800° C. The resulting charred residues are weighed and the results are reported in Table VI.

TABLE VI

| Sample No. | Polymer(1) | Metal(2) Type | Amount,pph | % Char(3) |
|---|---|---|---|---|
| 1 | 20 VBC/66 BrS/14S | — | — | 7 |
| 2 | 20 VBC/66 BrS/14S | $Fe_2O_3$ | 5 Fe | 33 |
| 3 | 20 VBC/66 BrS/14S | $Cu_2O$ | 5 Cu | 25 |
| 4 | 20 VBC/80 BrS | $Fe_2O_3$ | 10 Fe | 45 |
| 5 | 20 VBC/80 BrS | ZnO | 10 Zn | 34 |
| 6 | 20 VBC/40 BrS/40S | $Fe_2O_3$ | 10 Fe | 40 |
| 7 | 20 VBC/40 BrS/40S | ZnO | 10 Zn | 22 |
| 9 | 20 VBC/80 BrS | NiO | 5 Ni | 18 |
| 10 | 20 VBC/80 BrS | SnO | 5 Sn | 20 |
| 11 | 20 VBC/80 BrS | PbO | 5 Pb | 28 |
| 12 | 20 VBC/80 BrS | CaO | 5 Ca | 27 |
| 13 | 20 VBC/80 BrS | MgO | 5 Mg | 22 |
| 14 | 20 VBC/80 BrS | $Ag_2O$ | 5 Ag | 19 |
| 15 | 20 VBC/80 BrS | FeS | 5 Fe | 23 |
| 16 | 20 VBC/80 BrS | CuS | 5 Cu | 22 |
| 17 | 20 VBC/80 BrS | CuO | 5 Cu | 51 |
| 18 | 20 VBC/80 BrS | $Cr_2O_3$ | 5 Cr | 39 |
| 19 | 20 VBC/80 BrS | CoO | 5 Co | 51 |
| 20 | 20 VBC/80 BrS | $MoO_3$ | 5 Mo | 45 |
| 21 | 20 VBC/80 BrS | $Cu_2O$ | 5 Cu | 36 |

(1) Polymer in weight percent of various comonomers wherein VBC is vinylbenzyl chloride, BrS is bromostyrene, and S is styrene.
(2) Concentration of inorganic compound is expressed as parts of metal per 100 parts of polymer.
(3) Percent char determined by $\frac{\text{residue wt (g)}}{\text{initial sample wt (g)}} \times 100$.

What is claimed is:

1. A char-forming aromatic polymer composition comprising (1) a normally solid aromatic polymer containing polymerized bromostyrene in an amount to reduce the flame propagation characteristics of the aromatic polymer and dispersed in said composition (2) a char-forming amount in the range from about 0.1 to about 1.5 milliequivalents of a plurality of active benzyl and/or active allyl moieties per gram of the composition and (3) an inorganic compound in an amount effective to enhance char formation of the composition.

2. The composition of claim 1 wherein the aromatic polymer is a monovinylidene aromatic polymer and has dispersed therein a plurality of active benzyl moieties, said composition containing a combustion-resistant amount of a halogenated organic moiety.

3. The composition of claim 2 wherein the aromatic polymer is a styrene polymer containing at least 50 mole percent of polymerized styrene having dispersed therein polymerized vinylbenzyl moieties and a brominated organic moiety.

4. The composition of claim 2 wherein the plurality of benzyl moieties is a polymer of at least one of pentachlorophenyl vinylbenzyl ether, and tribromophenyl vinylbenzyl ether wherein said benzyl polymer supplies a part of said combustion resistant amount of halogenated organic moiety.

5. The composition of claim 4 comprising from about 2 to about 50 weight percent of halogen.

6. The composition of claim 3 wherein the benzylic moieties are an integral part of the aromatic polymer.

7. The composition of claim 1 wherein the aromatic polymer is an aromatic polycarbonate or an ABS resin.

8. The composition of claim 1 wherein the aromatic polymer is a styrene polymer and the benzyl moiety is a benzyl chloride.

9. The composition of claim 1 wherein the inorganic compound is an oxide of iron, nickel, copper, chromium, cobalt, zirconium, molybdenum or manganese.

10. A char-forming aromatic polymer composition comprising (1) a normally solid aromatic polymer and dispersed in said composition (2) a char-forming amount in the range from about 0.1 to about 1.5 milliequivalents of a plurality of active benzyl and/or active allyl moieties per gram of the composition and (3) a metal ferri or ferro cyanide salt in an amount effective to enhance char formation of the composition.

11. The composition of claim 10 which also contains a further char-promoting amount of calcium oxide.

12. The composition of claim 10 wherein the metal of the metal ferric or ferro cyanide salt is an alkali metal, nickel, calcium, barium, copper, chromium cobalt, zinc, manganese, magnesium and mixtures thereof.

13. The composition of claim 12 wherein the metal ferric or ferro cyanide salt is $Ni_3[Fe(CN)_6]_2$, $K_4Fe(CN)_6$, $K_2Ni_3[Fe(CN)_6]_2$, $K_2Zn_3[Fe(CN)_6]_2$ or $K_2CaFe(CN)_6$.

14. A char-forming aromatic polymer composition comprising (1) a normally solid aromatic polymer and dispersed in said composition, (2) a char-forming amount in the range from about 0.1 to about 1.5 milliequivalents of a plurality of active benzyl and/or active allyl moieties per gram of the composition and (3) an acetyl acetonate of copper, cobalt, manganese, vanadium, nickel, chromium or iron in an amount effective to enhance char formation of the composition.

15. The composition of claim 13 wherein the metal ferric or ferro cyanide salt is present in an amount from about 1 to about 20 weight percent based on the composition.

16. The composition of claim 15 which also contains a further char-promoting amount of an oxide of calcium, strontium, magnesium or barium.

17. The composition of claim 10 wherein the aromatic polymer is an aromatic polycarbonate or an ABS resin.

18. The composition of claim 10 wherein the aromatic polymer is a styrene polymer and the benzyl moiety is a benzyl chloride.

19. The composition of claim 10 wherein the aromatic polymer is a monovinylidene aromatic polymer and has dispersed therein a plurality of active benzyl moieties, said composition containing a combustion-resistant amount of a halogenated organic moiety.

20. The composition of claim 19 wherein the aromatic polymer is a styrene polymer containing at least 50 mole percent of polymerized styrene having dispersed therein polymerized vinylbenzyl moieties and a brominated organic moiety.

21. The composition of claim 19 wherein the plurality of benzyl moieties is a polymer of at least one of pentachlorophenyl vinylbenzyl ether and tribromophenyl vinylbenzyl ether wherein said benzyl polymer supplies a part of said combustion resistant amount of halogenated organic moiety.

* * * * *